US010931691B1

(12) United States Patent
Kapelevich et al.

(10) Patent No.: US 10,931,691 B1
(45) Date of Patent: Feb. 23, 2021

(54) METHODS FOR DETECTING AND MITIGATING BRUTE FORCE CREDENTIAL STUFFING ATTACKS AND DEVICES THEREOF

(71) Applicant: F5 Networks, Inc., Seattle, WA (US)

(72) Inventors: Michael Kapelevich, Seattle, WA (US); Tomer Zait, Seattle, WA (US); Maxim Zavodchik, Seattle, WA (US); Ron Talmor, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 104 days.

(21) Appl. No.: 16/147,326

(22) Filed: Sep. 28, 2018

Related U.S. Application Data

(60) Provisional application No. 62/569,810, filed on Oct. 9, 2017.

(51) Int. Cl.
*H04L 29/06* (2006.01)
*G06N 7/00* (2006.01)
*G06F 16/22* (2019.01)

(52) U.S. Cl.
CPC ...... *H04L 63/1416* (2013.01); *G06F 16/2255* (2019.01); *G06N 7/005* (2013.01); *H04L 63/1441* (2013.01)

(58) Field of Classification Search
CPC .................................................. H04L 63/1416
USPC ............................................................ 726/23
See application file for complete search history.

(56) References Cited

U.S. PATENT DOCUMENTS

| | | | |
|---|---|---|---|
| 4,783,828 A | 11/1988 | Sadjadi | |
| 5,537,488 A | 7/1996 | Menon et al. | |
| 6,118,893 A | 9/2000 | Li | |
| 6,748,056 B1 | 6/2004 | Capriotti et al. | |
| 6,769,066 B1 | 7/2004 | Botros et al. | |
| 7,100,195 B1 | 8/2006 | Underwood | |
| 7,228,412 B2 | 6/2007 | Freed | |
| 7,406,606 B2 | 7/2008 | Chawla et al. | |
| 7,519,834 B1 | 4/2009 | Dondeti et al. | |
| 8,126,722 B2 | 2/2012 | Robb | |
| 8,578,055 B2 | 11/2013 | Christenson et al. | |
| 8,832,804 B1* | 9/2014 | Casey | G06F 21/31 704/273 |
| 9,077,709 B1 | 7/2015 | Dall | |
| 9,438,419 B1* | 9/2016 | Aggarwal | H04L 9/0863 |
| 9,444,916 B2 | 9/2016 | Backholm | |
| 9,628,499 B1 | 4/2017 | Yu et al. | |
| 9,654,485 B1 | 5/2017 | Neumann | |
| 9,705,902 B1 | 7/2017 | Call et al. | |
| 9,800,602 B2 | 10/2017 | Shekyan et al. | |
| 10,574,697 B1* | 2/2020 | McClintock | H04L 63/1491 |
| 2002/0116615 A1 | 8/2002 | Nguyen et al. | |
| 2003/0042439 A1 | 3/2003 | Rusu et al. | |
| 2003/0073091 A1 | 4/2003 | Krylov et al. | |
| 2003/0145232 A1 | 4/2003 | Poletto et al. | |
| 2003/0182447 A1 | 9/2003 | Schilling | |
| 2003/0199762 A1 | 10/2003 | Fritz et al. | |
| 2004/0037326 A1 | 2/2004 | D'Souza et al. | |
| 2004/0103283 A1 | 5/2004 | Hornak | |
| 2004/0170123 A1 | 9/2004 | Carpenter et al. | |
| 2005/0027846 A1 | 2/2005 | Wolfe et al. | |
| 2005/0111367 A1 | 5/2005 | Chao et al. | |
| 2005/0195840 A1 | 9/2005 | Krapp et al. | |
| 2005/0198519 A1 | 9/2005 | Tamura et al. | |
| 2007/0118894 A1 | 5/2007 | Bhatia | |
| 2008/0028467 A1 | 1/2008 | Kommareddy et al. | |
| 2008/0196099 A1 | 8/2008 | Shastri | |
| 2008/0263215 A1 | 10/2008 | Schnellbaecher | |
| 2008/0320567 A1 | 12/2008 | Shulman et al. | |
| 2009/0199297 A1 | 8/2009 | Jarrett et al. | |
| 2009/0241173 A1* | 9/2009 | Troyansky | G06F 21/552 726/5 |
| 2009/0241174 A1 | 9/2009 | Rajan et al. | |
| 2010/0031315 A1 | 2/2010 | Feng et al. | |
| 2010/0070620 A1 | 3/2010 | Awadallah et al. | |
| 2010/0312875 A1 | 12/2010 | Wilerson | |
| 2010/0325418 A1 | 12/2010 | Kanekar | |
| 2011/0072516 A1 | 3/2011 | Cohen et al. | |

(Continued)

OTHER PUBLICATIONS

F5 Networks, Inc., "BIG-IP 13.0.1 Release Notes", May 21, 2018, 22 pages, 13.0.1, F5 Networks, Inc., Retrieved from the Internet: <https://support.f5.com/kb/en-us/products/big-ip_ltm/releasenotes/product/relnote-bigip-13-0-1.html>.

F5 Networks, Inc., "BIG-IP Application Security Manager Operations Guide", Apr. 2018, 100 pages, F5 Networks, Inc., Retrieved from the Internet: <https://support.f5.com/kb/en-us/products/big-ip_asm/manuals/product/f5-asm-operations-guide.html>.

F5 Networks, Inc., "BIG-IP® Application Security Manager™: Attack and Bot Signatures", Feb. 13, 2017, 48 pages, 13.0, F5 Networks, Inc., Retrieved from the Internet: <https://support.f5.com/kb/en-us/products/big-ip_asm/manuals/product/asm-bot-and-attack-signatures-13-0-0.html>.

(Continued)

*Primary Examiner* — Jacob Lipman
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that obtain a dictionary comprising a plurality of credentials and populate a probabilistic data structure based on the dictionary. A login request is received from a client and one or more credentials are extracted from the received login request. A determination of when the probabilistic data structure indicates that the extracted credentials are included in the dictionary is made. A mitigation action is initiated with respect to the client, when the determination indicates that the probabilistic data structure indicates that the extracted credentials are included in the dictionary. This technology more efficiently and effectively detects and mitigates brute force credential stuffing attacks advantageously using a reduced amount of resources.

20 Claims, 5 Drawing Sheets

(56) References Cited

U.S. PATENT DOCUMENTS

| | | | |
|---|---|---|---|
| 2011/0083181 A1* | 4/2011 | Nazarov | G06F 21/562 726/23 |
| 2011/0154026 A1 | 6/2011 | Edstrom | |
| 2011/0264621 A1 | 10/2011 | Burjoski | |
| 2011/0264905 A1 | 10/2011 | Ovsiannikov | |
| 2012/0017090 A1 | 1/2012 | Gould | |
| 2012/0090030 A1 | 4/2012 | Rapaport et al. | |
| 2012/0117239 A1 | 5/2012 | Holloway et al. | |
| 2012/0117621 A1 | 5/2012 | Kondamuru | |
| 2012/0144487 A1 | 6/2012 | Kim et al. | |
| 2012/0254386 A1 | 10/2012 | Smith | |
| 2012/0323700 A1 | 12/2012 | Aleksandrovich et al. | |
| 2013/0276114 A1 | 10/2013 | Friedrichs et al. | |
| 2014/0095865 A1 | 4/2014 | Yerra | |
| 2014/0181922 A1* | 6/2014 | Jakobsson | G06F 21/46 726/5 |
| 2014/0298419 A1 | 10/2014 | Boubez | |
| 2014/0317739 A1 | 10/2014 | Be'ery et al. | |
| 2014/0373088 A1* | 12/2014 | Aggarwal | G06F 21/604 726/1 |
| 2015/0068328 A1 | 3/2015 | Rudolph et al. | |
| 2015/0128236 A1 | 5/2015 | Moscicki et al. | |
| 2015/0163234 A1 | 6/2015 | Tal et al. | |
| 2015/0271179 A1 | 9/2015 | Wang et al. | |
| 2015/0295945 A1 | 10/2015 | Canzanese, Jr. et al. | |
| 2015/0310196 A1 | 10/2015 | Turgeman et al. | |
| 2016/0080345 A1 | 3/2016 | Safruti et al. | |
| 2016/0080412 A1 | 3/2016 | Smith | |
| 2017/0063923 A1 | 3/2017 | Yang et al. | |

OTHER PUBLICATIONS

F5 Networks, Inc., "F5 BIG-IP TMOS: Operations Guide", Apr. 2018, 229 pages, F5 Networks, Inc., Retrieved from the Internet: <https://support.f5.com/kb/en-us/products/big-ip_ltm/manuals/product/f5-tmos-operations-guide.html>.

F5 Networks, Inc., "BIG-IP® Application Security Manager®: Getting Started", Feb. 6, 2017, 46 pages, F5 Networks, Inc., Retrieved from the Internet: <https://support.f5.com/kb/en-us/products/big-ip_asm/manuals/product/asm-getting-started-13-0-0.html>.

"BIG-IP® Analytics: Implementations," Version 11.3, F5 Networks, Inc., Publication No. MAN-0357-03, pp. 1-40, Nov. 15, 2012.

"BIG-IP Local Traffic Manager™: Concepts," Version 11.4, F5 Networks, Inc., Publication No. MAN-0377-05, pp. 1-178, Sep. 26, 2013.

"BIG-IP® Local Traffic Manager™: Implementations," Version 11.4, F5 Networks, Inc., Publication No. MAN-0293-08, pp. 1-234, Nov. 19, 2014.

"Big-IP® Local Traffic Manager™: Monitors Reference", Version 11.4, F5 Networks, Inc., Publication No. MAN 0470-00, pp. 1-106, Nov. 26. 2013.

"Operations Guide 1.0 F5 Local Traffic Manager and Global Traffic Manager," F5 Networks, Publication No. BIG-IP LTMGTMOps-01_0_0, pp. 1-144, Dec. 12, 2014.

"Release Note: BIG-IP LTM and TMOS," Version 11.4.1, F5 Networks, Inc., pp. 1-58, Dec. 18, 2014.

"BIG-IP Application Security Manager Operations Guide," Versions 11.6-12.0, F5 Networks, Inc., Publication No. BIG-IPASMOps 01_1, pp. 1-181, Jul. 2016.

"BIG-IP ASM 11.5.0," Release Notes, F5 Networks, Inc., pp. 1-44, Apr. 12, 2016.

"BIG-IP ASM 11.6.1," Release Notes, F5 Networks, Inc., pp. 1-18, Jun. 13, 2016.

"BIG-IPo® Analytics: Implementations," Version 11.5, F5 Networks, Inc., Publication No. MAN-0357-05, pp. 1-50, Aug. 25, 2015.

"BIG-IP® Analytics: Implementations," Version 11.6, F5 Networks, Inc., Publication No. MAN-0357-06, pp. 1-62, Aug. 24, 2015.

"BIG-IP® Application Security Manager™: Getting Started," Version 11.6, F5 Networks, Inc., Publication No. MAN-0285-09, pp. 1-78, Aug. 20, 2014.

"BIG-IP® Application Security Manager™: Implementations," Version 11.6, F5 Networks, Inc., Publication No. MAN-0358-07, pp. 1-420, Aug. 20, 2014.

"BIG-IP® Application Security Manager™: Implementations," Version 11.5, F5 Networks, Inc., Publication No. MAN-0358-06, pp. 1-396. , Jan. 27, 2014.

"Big-IP® Local Traffic Management: Basics," Version 11.6, F5 Networks, Inc., Publication No. MAN-0538-00, pp. 1-74, Mar. 17, 2016.

"BIG-IP® Network Firewall: Policies and Implementations," Version 11.6, F5 Networks, Inc., Publication No. MAN-0439-04, pp. 1-166, Aug. 20, 2014.

"BIG-IP® Systems: DoS Protection and Protocol Firewall Implementations," Version 11.6, F5 Networks, Inc., Publication No. MAN-0440-03, pp. 1-108, Aug. 20, 2014.

"BIG-IP® TMOS®: Concepts," Version 11.5, F5 Networks, Inc., Publication No. MAN-0378-04, pp. 1-148, May 1, 2014.

"BIG-IP® TMOS®: Implementations," Version 11.5, F5 Networks, Inc., Publication No. MAN-0379-05, pp. 1-274, Sep. 2, 2014.

"BIG-IP® DNS Services: Implementations," Version 11.5, F5 Networks, Inc., Publication No. MAN-0446-02, pp. 1-156, Jan. 27, 2014.

"BIG-IP® DNS Services: Implementations," Version 11.3, F5 Networks, Inc., Publication No. MAN-0446-00, pp. 1-76, Feb. 5, 2016.

"BIG-IP® Global Traffic Manger™:Implementations," Version 11.4, F5 Networks, Inc., Publication No. MAN-0388-03, pp. 1-106, Feb. 21, 2014.

Tegeler et al., "BotFinder: Finding Bots in Network Traffic Without Deep Packet Inspection," In Proceedings of the 8th International Conference on Emerging Networking Experiments and Technologies, pp. 349-360, Dec. 10-13, 2012.

Zhang et al., "Boosting the Scalability of Botnet Detection Using Adaptive Traffic Sampling," Proceedings of the 6th ACM Symposium on Information, Computer and Communications Security, pp. 124-134, Mar. 22-24, 2011.

\* cited by examiner

| False Positives rate (P) | Bits per element (B) | Ceiling(B) | Number of hashes (K) | Ceiling(K) | Bytes for 1 element | MB per 1 MLN elements | MB per 10 MLN elements |
|---|---|---|---|---|---|---|---|
| 0.01 | 9.585058377 | 10 | 6.931471806 | 7 | 8.75 | 8.34 | 83.45 |
| 0.02 | 8.142363338 | 9 | 6.238324625 | 7 | 7.875 | 7.51 | 75.10 |
| 0.05 | 6.235224233 | 7 | 4.863030264 | 5 | 4.375 | 4.17 | 41.72 |
| 0.1 | 4.792529189 | 5 | 3.465735903 | 4 | 2.5 | 2.38 | 23.84 |
| 0.2 | 3.349834148 | 4 | 2.772588722 | 3 | 1.5 | 1.43 | 14.31 |
| 0.3 | 2.505911649 | 3 | 2.079441542 | 3 | 1.125 | 1.07 | 10.73 |
| 0.4 | 1.907139107 | 2 | 1.386294361 | 2 | 0.5 | 0.48 | 4.77 |

METHODS FOR DETECTING AND MITIGATING BRUTE FORCE CREDENTIAL STUFFING ATTACKS AND DEVICES THEREOF

This application claims the benefit of U.S. Provisional Patent Application Ser. No. 62/569,810 filed Oct. 9, 2017, which is hereby incorporated by reference in its entirety.

FIELD

This technology generally relates to network security and, more particularly, to methods and devices for improved detection and mitigation of brute force credential stuffing attacks.

BACKGROUND

Many networks include network traffic management apparatuses that perform any number of functions from load balancing and application acceleration to authentication. Network traffic management apparatuses also can provide security services that protect web applications hosted by servers from attacks. In one such brute force attack, referred to herein as credential stuffing, malicious actors utilize a dictionary of stolen or leaked credentials to guess the credentials for a user that will be successfully authenticated. Following a successful authentication, a malicious actor can perform a takeover of a user's account.

Current methods for preventing brute force attacks on web applications generally restrict the number of authentication attempts for a user to a relatively low threshold number. However, in a credential stuffing attack such a threshold is not reached since there is generally only one authentication attempt for any particular user or set of credentials. More specifically, a malicious actor will attempt to gain access using a set of credentials and, if unsuccessful, will proceed with another set of credentials.

Accordingly, credential stuffing attacks do not involve multiple authentication attempts with a same user name and different password, for example, and therefore current brute force attack prevention methods are insufficient to protect web applications from credential stuffing attacks. Moreover, dictionaries of stolen or leaked credentials often include millions of entries and therefore cannot practically be loaded into memory for facilitating a comparison with credentials received via a login attempt.

SUMMARY

A method for detecting and mitigating brute force credential stuffing attacks is implemented by a network traffic management system comprising one or more network traffic management apparatuses, one or more server devices, or one or more client devices and includes obtaining a dictionary comprising a plurality of credentials and populating a probabilistic data structure based on the dictionary. A login request is received from a client and one or more credentials are extracted from the received login request. A determination of when the probabilistic data structure indicates that the extracted credentials are included in the dictionary is made. A mitigation action is initiated with respect to the client, when the determination indicates that the probabilistic data structure indicates that the extracted credentials are included in the dictionary.

A network traffic management apparatus, comprising memory comprising programmed instructions stored thereon and one or more processors configured to be capable of executing the stored programmed instructions to obtain a dictionary comprising a plurality of credentials and populate a probabilistic data structure based on the dictionary. A login request is received from a client and one or more credentials are extracted from the received login request. A determination of when the probabilistic data structure indicates that the extracted credentials are included in the dictionary is made. A mitigation action is initiated with respect to the client, when the determination indicates that the probabilistic data structure indicates that the extracted credentials are included in the dictionary.

A non-transitory computer readable medium having stored thereon instructions for detecting and mitigating brute force credential stuffing attacks includes executable code that, when executed by one or more processors, causes the processors to obtain a dictionary comprising a plurality of credentials and populate a probabilistic data structure based on the dictionary. A login request is received from a client and one or more credentials are extracted from the received login request. A determination of when the probabilistic data structure indicates that the extracted credentials are included in the dictionary is made. A mitigation action is initiated with respect to the client, when the determination indicates that the probabilistic data structure indicates that the extracted credentials are included in the dictionary.

A network traffic management system includes one or more network traffic management apparatuses, one or more server devices, or one or more client devices, memory comprising programmed instructions stored thereon, and one or more processors configured to be capable of executing the stored programmed instructions to obtain a dictionary comprising a plurality of credentials and populate a probabilistic data structure based on the dictionary. A login request is received from a client and one or more credentials are extracted from the received login request. A determination of when the probabilistic data structure indicates that the extracted credentials are included in the dictionary is made. A mitigation action is initiated with respect to the client, when the determination indicates that the probabilistic data structure indicates that the extracted credentials are included in the dictionary.

This technology has a number of associated advantages including providing methods, non-transitory computer readable media, network traffic management apparatuses, and network traffic management systems that more efficiently and effectively detect and mitigate brute force credential stuffing attacks. With this technology, a potential credential stuffing attack can be detected using a reduced amount of memory via a space-efficient probabilistic data structure, thereby allowing an increased portion of the memory to be utilized for other services and improving the functionality of network traffic management apparatuses. Accordingly, this technology advantageously facilitates improved network security and protection of web applications from credential stuffing attacks and associated account takeovers.

BRIEF DESCRIPTION OF THE DRAWINGS

FIG. 4 is a table illustrating the performance and false positive rate of exemplary probabilistic data structures.

DETAILED DESCRIPTION

Figure 1:
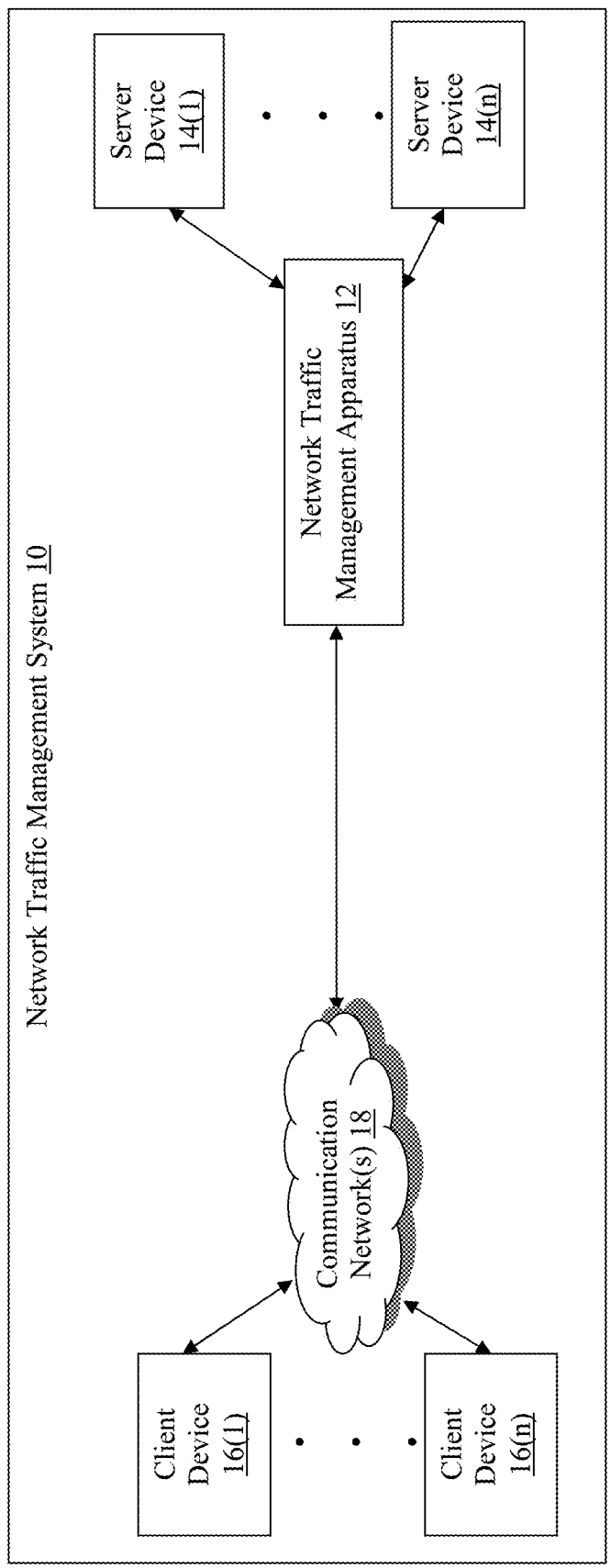
FIG. 1 is a block diagram of an exemplary network traffic management system with a network traffic management apparatus.

Referring to FIG. 1, an exemplary network environment that incorporates an exemplary network traffic management system 10 is illustrated. The network traffic management system 10 in this example includes a network traffic management apparatus 12 that is coupled to a plurality of server devices 14(1)-14(n) and a plurality of client devices 16(1)-16(n) via communication network(s) 18, although the network traffic management apparatus 12, server devices 14(1)-14(n), or client devices 16(1)-16(n) may be coupled together via other topologies. Additionally, the network traffic management system 10 may include other network devices such as one or more routers or switches, for example, which are well known in the art and thus will not be described herein. This technology provides a number of advantages including methods, non-transitory computer readable media, network traffic management systems, and network traffic management apparatuses that more effectively detect and mitigate brute force credential stuffing attacks to improve protection of web applications.

Figure 2:
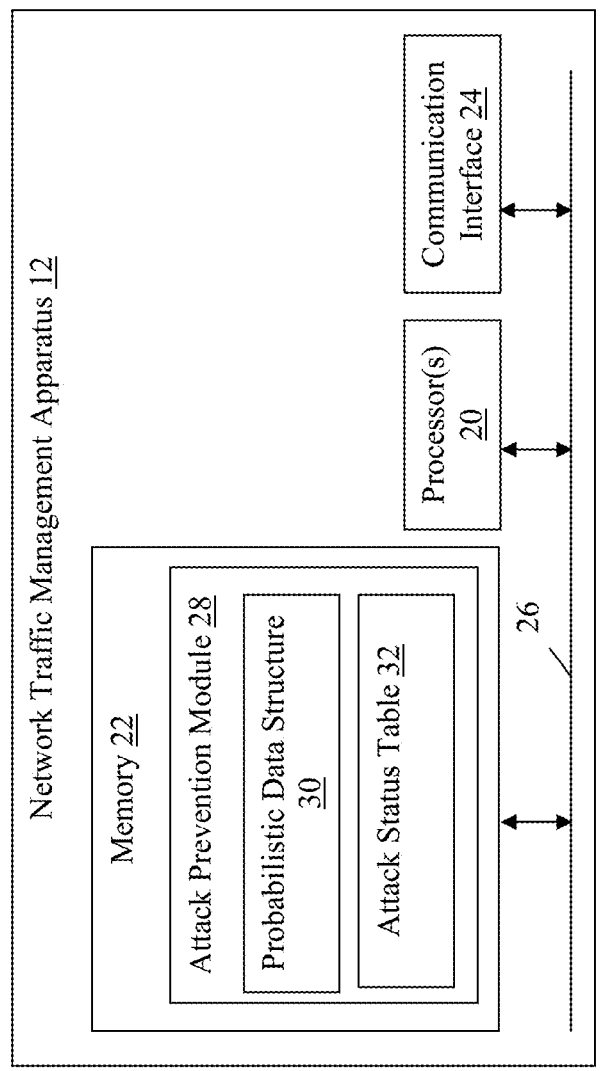
FIG. 2 is a block diagram of an exemplary network traffic management apparatus.

Referring to FIGS. 1-2, the network traffic management apparatus 12 of the network traffic management system 10 may perform any number of functions in addition to preventing network attacks including managing network traffic, load balancing network traffic across the server devices 14(1)-14(n), or accelerating network traffic associated with web applications hosted by the server devices 14(1)-14(n), for example. The network traffic management apparatus 12 in this example includes one or more processors 20, a memory 22, and a communication interface 24, which are coupled together by a bus 26, although the network traffic management apparatus 12 can include other types or numbers of elements in other configurations.

The processor(s) 20 of the network traffic management apparatus 12 may execute programmed instructions stored in the memory 22 of the network traffic management apparatus 12 for any number of the functions identified above. The processor(s) 20 of the network traffic management apparatus 12 may include one or more central processing units (CPUs) or general purpose processors with one or more processing cores, for example, although other types of processor(s) can also be used.

The memory 22 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory 22 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more examples of this technology, virtual machine(s) running on the network traffic management apparatus 12 may be managed or supervised by a hypervisor.

In this particular example, the memory 22 of the network traffic management apparatus 12 includes an attack prevention module 28 that includes a probabilistic data structure 30 and an attack status table 32. The attack prevention module 28 generally populates the probabilistic data structure 30 based on a received dictionary of stolen or leaked credentials, for example. The attack prevention module 28 then processes received login requests to determine whether the requests include credentials that are known publicly and are likely included in the dictionary in order to make a determination with respect to whether a target web application hosted by one or more of the server devices 14(1)-14(n) may be under a credential stuffing attack.

In this example the attack prevention module 28 utilizes an attack status table 32 to maintain counters that are optionally used to determine whether threshold(s) have been reached and a credential stuffing attack is occurring. The attack prevention module 28 also carries out mitigation techniques such as sending client-scripts or CAPTCHAs or dropping login requests, for example.

The communication interface 24 of the network traffic management apparatus 12 operatively couples and communicates between the network traffic management apparatus 12, the server devices 14(1)-14(n), or the client devices 16(1)-16(n), which are all coupled together by the communication network(s) 18, although other types or numbers of communication networks or systems with other types or numbers of connections or configurations to other devices or elements can also be used.

By way of example only, the communication network(s) 18 can include local area network(s) (LAN(s)) or wide area network(s) (WAN(s)), and can use TCP/IP over Ethernet and industry-standard protocols, although other types or numbers of protocols or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when a device illustrated in FIG. 1, such as the network traffic management apparatus 12, one or more of the client devices 16(1)-16(n), or one or more of the server devices 14(1)-14(n) operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes one or more processors, a memory, and a communication interface, which are coupled together by a bus or other communication link, although other numbers or types of network devices could be used. The server devices 14(1)-14(n) in this example process login and other requests received from the client devices 16(1)-16(n) via the communication network(s) 18 according to the HTTP-based application RFC protocol, for example. Various web applications may be operating on the server devices 14(1)-14(n) and transmitting data (e.g., files or web pages) to the client devices 16(1)-16(n) via the network traffic management apparatus 12 in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via communication network(s). In this example, the one or more server devices 14(1)-14(n) operate within the memory 22 of the network traffic management apparatus 12.

The client devices 16(1)-16(n) of the network traffic management system 10 in this example include any type of computing device that can exchange network data and interface with web applications hosted by the server devices 14(1)-14(n), such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers or types of network devices could be used.

The client devices 16(1)-16(n) may run interface applications, such as standard web browsers or standalone client applications, which may provide an interface to make requests for, and receive content stored on, one or more of the server devices 14(1)-14(n) via the communication network(s) 18. The client devices 16(1)-16(n) may further include a display device, such as a display screen or touchscreen, or an input device, such as a keyboard for example.

Although the exemplary network traffic management system 10 with the network traffic management apparatus 12, server devices 14(1)-14(n), client devices 16(1)-16(n), and communication network(s) 18 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, client devices 16(1)-16(n), or server devices 14(1)-14(n), for example, may be configured to operate as virtual instances on the same physical machine. In other words, one or more of the network traffic management apparatus 12, client devices 16(1)-16(n), or server devices 14(1)-14(n) may operate on the same physical device rather than as separate devices communicating through communication network(s) 18. Additionally, there may be more or fewer network traffic management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 22, for one or more aspects of the present technology as described and illustrated by way of the examples herein. The instructions in some examples include executable code that, when executed by one or more processors, such as the processor(s) 20, cause the processors to carry out steps necessary to implement the methods of the examples of this technology that are described and illustrated herein.

Figure 3:
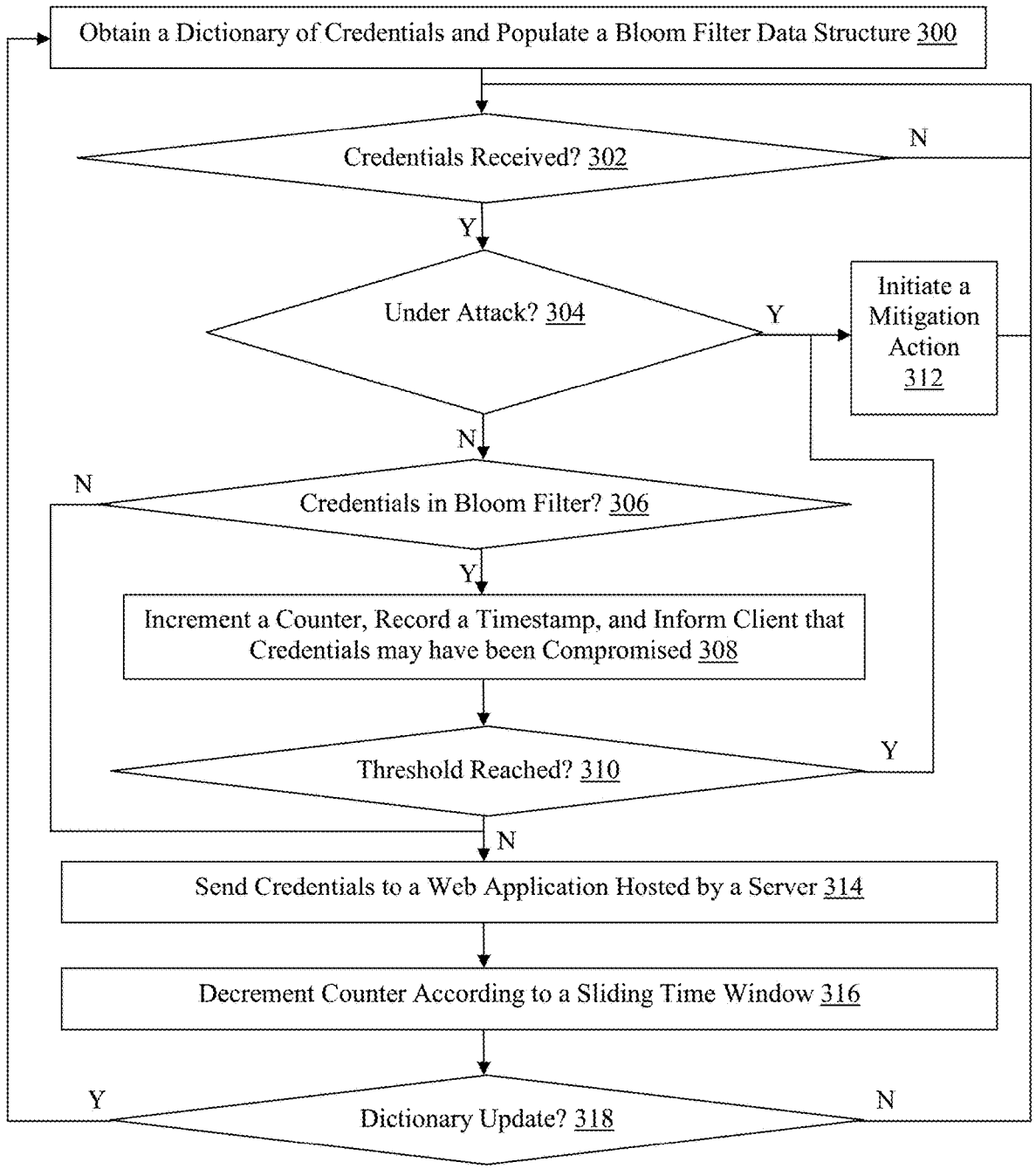
FIG. 3 is a flowchart of an exemplary method for detecting and mitigating brute force credential stuffing attacks.

Referring more specifically to FIG. 3, a flowchart of an exemplary method of detecting and mitigating brute force credential stuffing attacks is illustrated. In step 300 in this example, the network traffic management apparatus 12 of the network traffic management system 10 may obtain a dictionary of credentials and populate a probabilistic data structure 30. The dictionary includes stolen or leaked credentials that have been made available publicly by third parties in this example. The credentials can be username and password pairs or any other types of identifier or login parameters, for example. The dictionary can be in the form of a list, table, or database, for example, although the dictionary can also be in another type of format.

In one example, the probabilistic data structure 30 is a bloom filter, although any other type of probabilistic data structure that can be used for set membership testing can also be used, such as a cuckoo filter, count-min sketch, locality-sensitive hashing (LSH), or quotient filter by way of example only. The bloom filter data structure in this example is a relatively space-efficient probabilistic data structure that is used to test whether an element is a member of a set. While false positives are possible, false negatives are not possible.

In an exemplary bloom filter data structure having a maximum number of N elements (e.g., username/password pairs), every element is represented using K hash functions that produce a digest of B bits. To populate the bloom filter data structure, the network traffic management apparatus 12 feeds each element of the dictionary obtained in step 300 to each of the K hash functions to obtain k array positions, corresponding to the output of the K hash functions, and sets a bit at each of the K array positions (e.g., to "1").

The probability of false positives or false positive rate (P) is given by the following formula: $P=(1-e^{-\frac{K}{B}})^{K}$. Additionally, the optimal number of bits (B) for representing a single element is based on the required or desired false positive rate (P), and can be determined using the following formula: $B=\frac{\ln(\frac{1}{P})}{\ln(2)^{2}}$. In this example, an optimal number of hash functions (K) depends on the number of bits (B) and can be determined using the following formula: $K=B\times \ln(2)$.

Referring to FIG. 4, a table is illustrated that includes exemplary false positive rates (P), bits per element (B), number of hash functions (K), bytes for 1 element, megabytes per 1 million elements, and megabytes per 10 million elements for exemplary bloom filter data structures. As illustrated in FIG. 4, only 83.45 megabytes are required to reflect 10 million elements when a bloom filter data structure with the least tolerant false positive rate (P) of 0.01 is selected. Accordingly, utilizing the bloom filter data structure to detect and prevent credential stuffing brute force attacks with this technology, as described and illustrated in more detail later, advantageously requires a relatively low amount of memory, thereby improving the functioning of the network traffic management apparatus 12.

Referring back to FIG. 3, in step 302, the network traffic management apparatus 12 determines whether credentials have been received, such as from one of the client devices 16(1)-16(n). The credentials can be extracted from a received request to log into a web application hosted by one of the server devices 14(1)-14(n), for example. If the network traffic management apparatus 12 determines that credentials have not been received, then the No branch is taken back to step 302 and the network traffic management apparatus 12 effectively waits for credentials to be received. However, if the network traffic management apparatus 12 determines that credentials have been received, then the Yes branch is taken to step 304.

In step 304, the network traffic management apparatus 12 determines whether there currently is a credential stuffing brute force attack. In this example, if the network traffic management apparatus 12 has identified a prior attack, the login request may be treated differently (e.g., dropped) in order to protect one or more of the server devices 14(1)-14(n) as compared to a login request received when the network traffic management apparatus 12 has not previously identified an attack. Accordingly, if the network traffic management apparatus 12 determines that it is not currently under attack, then the No branch is taken to step 306.

In step 306, the network traffic management apparatus 12 determines whether the probabilistic data structure 30 indicates the credentials extracted from the received login request are included in the dictionary obtained in step 300 in this example. To determine whether the probabilistic data structure 30 indicates the extracted credentials are included in the dictionary in examples in which the probabilistic data structure 30 is a bloom filter, the extracted credentials can be fed to the same K hash functions that were used to populate the bloom filter data structure to obtain k array positions. If any of the bits at the k array positions is not set (e.g., is "0"), then the credentials are definitely not in the dictionary.

However, if all of the bits at the k array positions are set (e.g., are "1"), then the bloom filter data structure indicates the extracted credentials are included in the dictionary, which may be true or may be a false positive. If the network traffic management apparatus 12 determines that the probabilistic data structure 30 indicates the extracted credentials are included in the dictionary, then the Yes branch is taken to step 308.

In step 308, the network traffic management apparatus optionally increments a counter, records a timestamp, or responds to the login request with an indication that the provided credentials may have been compromised. While the counter in this example relates to the overall number of likely matches in the dictionary based on a positive result in step 306, the counters could relate to particular device IDs, source IP addresses, or any other identifier or data that can be extracted from received login requests.

In step 310, the network traffic management apparatus 12 optionally determines whether a threshold number of likely matches in the dictionary have been identified based on the incremented counter. The threshold can be configurable and allows for a grace period during which one or more relatively severe mitigation actions are restricted. Since the probabilistic data structure 30 can result in false positives, it may be desirable in some examples to delay certain mitigation actions until an increased level of confidence is reached that the network traffic management apparatus 12 is under an attack.

Figure 5:
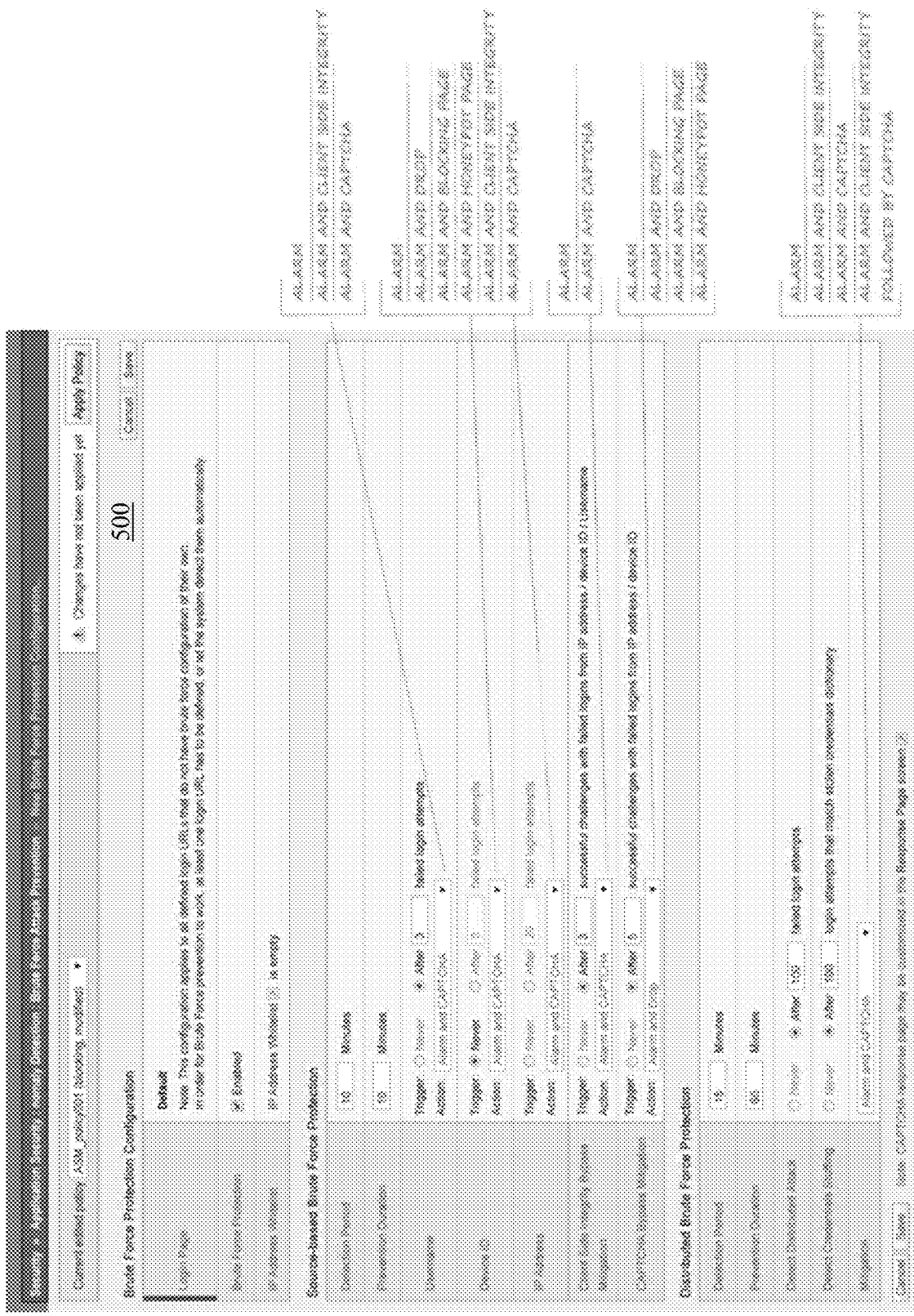
FIG. 5 is an exemplary graphical user interface (GUI) for establishing various parameters used to detect and mitigate brute force credential stuffing attacks.

Referring more specifically to FIG. 5, an exemplary graphical user interface (GUI) 500 for establishing various parameters relating to detecting and mitigating brute force credential stuffing attacks is illustrated. In this example, the GUI 500 can be used to set particular mitigation actions (e.g., CAPTCHA response, an alert, and a silent drop) that are implemented based on a particular number of failed login attempts for particular sources (e.g., username, device ID, and IP address). Additionally, a mitigation action (e.g., a CAPTCHA response) can be selected that is implemented after a threshold number of failed login attempts (e.g., 100) has been observed within a particular sliding time window (15 minutes). Any other types of configurations and settings can also be established in other examples.

Referring back to FIG. 3, if the network traffic management apparatus 12 determines in step 310 that a threshold number of likely matches in the dictionary has been identified, or back in step 304 that the network traffic management apparatus 12 is currently under attack, then the respective Yes branch is taken from steps 310 or 304, respectively, to step 312. In step 312, the network traffic management apparatus 12 initiates a mitigation action. Optionally, the mitigation action can result in dropping the login request or initiating a challenge (e.g., a CAPTCHA). Accordingly, in some examples the network traffic management apparatus 12 may proceed to step 302 following step 312, and in other examples the network traffic management apparatus 12 may proceed to step 314 based on a response to the mitigation action initiated in step 312, and other steps can also be performed in other examples. Additionally, other types of mitigation actions can be initiated in step 312.

Referring back to step 310 in this example, if the network traffic management apparatus 12 determines that a threshold number of likely matches in the dictionary has not been identified, then the No branch is taken to step 314. In step 314, the network traffic management apparatus 12 sends the credentials to a web application hosted by one of the server devices 14(1)-14(n) and to which the login request, from which the credentials were extracted in step 302, was directed.

In step 316, the network traffic management apparatus 12 decrements the counter according to a sliding time window. In one example, the network traffic management apparatus 12 determines whether the counter was incremented outside of a sliding time window having a particular duration (e.g., 15 minutes in the example described and illustrated in FIG. 4). Whether the counter was incremented outside of the sliding time window can be determined based on the timestamp recorded upon incrementing the counter in step 308, although other methods of determining whether the counter was incremented outside of the sliding time window, or of decrementing the counter, can also be used in other examples.

In step 318, the network traffic management apparatus 12 determines whether a dictionary update is available. Updates to the dictionary may be provided periodically based on updates at the third party sources of leaked or stolen credentials, for example. The network traffic management apparatus 12 can periodically poll for updates, or the updates can be provided remotely, and other methods of updating the dictionary can also be provided. If the network traffic management apparatus 12 determines that a dictionary update is not available, then the No branch is taken back to step 302.

However, if the network traffic management apparatus 12 determines in step 318 that a dictionary update is currently available, then the Yes branch is taken to step 300 and the probabilistic data structure 30 is updated and populated based on the updates to the dictionary. One or more of steps 300-318 can be performed in a different order in other examples and one or more of steps 302-314 can also be performed in parallel for any number of login requests received from any number of the client devices 16(1)-16(n).

As described and illustrated by way of the examples herein, this technology advantageously facilitates more effective detecting and mitigating brute force credential stuffing attacks. In particular, this technology can identify a potential credential stuffing attack using a reduced amount of memory, thereby allowing the memory to be utilized for other services and functionality. Accordingly, with this technology, web applications can be better protected from network attacks, and account takeovers due to misappropriated credentials can be reduced.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for detecting and mitigating brute force credential stuffing attacks implemented by a network traffic management system comprising one or more network traffic management apparatuses, one or more server devices, or one or more client devices, the method comprising:
    obtaining a dictionary comprising a plurality of credentials and populating a probabilistic data structure based on the dictionary;
    receiving a login request from a client and extracting one or more credentials from the received login request;
    determining when the probabilistic data structure indicates that the extracted credentials are included in the dictionary; and
    initiating a mitigation action with respect to the client, when the determination indicates that the probabilistic data structure indicates that the extracted credentials are included in the dictionary.

2. The method of claim 1, further comprising sending a notification to the client indicating that the extracted credentials may have been compromised, when the determination indicates that the probabilistic data structure indicates that the extracted credentials are included in the dictionary.

3. The method of claim 1, wherein the probabilistic data structure comprise a bloom filter data structure and the method further comprising:
    applying a plurality of hash function to each of the credentials to generate a plurality of digests for the credentials; and
    setting a plurality of bits based on the digests in order to populate the bloom filter data structure.

4. The method of claim 1, further comprising:
    incrementing a counter when the determination indicates that the probabilistic data structure indicates that the extracted credentials are included in the dictionary;
    determining when a threshold number of likely matches in the dictionary has been identified based on the incremented counter; and
    initiating the mitigation action, when the determination indicates that the threshold number of likely matches in the dictionary has been identified.

5. The method of claim 4, further comprising:
    recording a time each time the counter is incremented;
    determining when each recorded time is outside of a sliding time window; and
    decrementing the counter, when the determination indicates that each recorded time is outside of the sliding time window.

6. A network traffic management apparatus, comprising memory comprising programmed instructions stored thereon and one or more processors configured to be capable of executing the stored programmed instructions to:

obtain a dictionary comprising a plurality of credentials and populate a probabilistic data structure based on the dictionary;

receive a login request from a client and extract one or more credentials from the received login request;

determine when the probabilistic data structure indicates that the extracted credentials are included in the dictionary; and initiate a mitigation action with respect to the client, when the determination indicates that the probabilistic data structure indicates that the extracted credentials are included in the dictionary.

7. The network traffic management apparatus of claim 6, wherein the processors are further configured to be capable of executing the stored programmed instructions to send a notification to the client indicating that the extracted credentials may have been compromised, when the determination indicates that the probabilistic data structure indicates that the extracted credentials are included in the dictionary.

8. The network traffic management apparatus of claim 6, wherein the probabilistic data structure comprise a bloom filter data structure and the processors are further configured to be capable of executing the stored programmed instructions to:

apply a plurality of hash function to each of the credentials to generate a plurality of digests for the credentials; and set a plurality of bits based on the digests in order to populate the bloom filter data structure.

9. The network traffic management apparatus of claim 6, wherein the processors are further configured to be capable of executing the stored programmed instructions to:

increment a counter when the determination indicates that the probabilistic data structure indicates that the extracted credentials are included in the dictionary;

determine when a threshold number of likely matches in the dictionary has been identified based on the incremented counter; and initiate the mitigation action, when the determination indicates that the threshold number of likely matches in the dictionary has been identified.

10. The network traffic management apparatus of claim 9, wherein the processors are further configured to be capable of executing the stored programmed instructions to:

record a time each time the counter is incremented;

determine when each recorded time is outside of a sliding time window; and decrement the counter, when the determination indicates that each recorded time is outside of the sliding time window.

11. A non-transitory computer readable medium having stored thereon instructions for detecting and mitigating brute force credential stuffing attacks comprising executable code that, when executed by one or more processors, causes the processors to:

obtain a dictionary comprising a plurality of credentials and populate a probabilistic data structure based on the dictionary;

receive a login request from a client and extract one or more credentials from the received login request;

determine when the probabilistic data structure indicates that the extracted credentials are included in the dictionary; and initiate a mitigation action with respect to the client, when the determination indicates that the probabilistic data structure indicates that the extracted credentials are included in the dictionary.

12. The non-transitory computer readable medium of claim 11, wherein the executable code, when executed by the processors, further causes the processors to send a notification to the client indicating that the extracted credentials may have been compromised, when the determination indicates that the probabilistic data structure indicates that the extracted credentials are included in the dictionary.

13. The non-transitory computer readable medium of claim 11, wherein the probabilistic data structure comprise a bloom filter data structure and the executable code, when executed by the processors, further causes the processor to:

apply a plurality of hash function to each of the credentials to generate a plurality of digests for the credentials; and set a plurality of bits based on the digests in order to populate the bloom filter data structure.

14. The non-transitory computer readable medium of claim 11, wherein the executable code, when executed by the processors further causes the processors to:

increment a counter when the determination indicates that the probabilistic data structure indicates that the extracted credentials are included in the dictionary;

determine when a threshold number of likely matches in the dictionary has been identified based on the incremented counter; and initiate the mitigation action, when the determination indicates that the threshold number of likely matches in the dictionary has been identified.

15. The non-transitory computer readable medium of claim 14, wherein the executable code, when executed by the processors, further causes the processors to:

record a time each time the counter is incremented;

determine when each recorded time is outside of a sliding time window; and decrement the counter, when the determination indicates that each recorded time is outside of the sliding time window.

16. A network traffic management system, comprising one or more traffic management apparatuses, one or more client devices, or one or more server devices, the network traffic management system comprising memory comprising programmed instructions stored thereon and one or more processors configured to be capable of executing the stored programmed instructions to:

obtain a dictionary comprising a plurality of credentials and populate a probabilistic data structure based on the dictionary;

receive a login request from a client and extract one or more credentials from the received login request;

determine when the probabilistic data structure indicates that the extracted credentials are included in the dictionary; and initiate a mitigation action with respect to the client, when the determination indicates that the probabilistic data structure indicates that the extracted credentials are included in the dictionary.

17. The network traffic management system of claim 16, wherein the processors are further configured to be capable of executing the stored programmed instructions to send a notification to the client indicating that the extracted credentials may have been compromised, when the determination indicates that the probabilistic data structure indicates that the extracted credentials are included in the dictionary.

18. The network traffic management system of claim 16, wherein the probabilistic data structure comprise a bloom filter data structure and the processors are further configured to be capable of executing the stored programmed instructions to:
apply a plurality of hash function to each of the credentials to generate a plurality of digests for the credentials; and
set a plurality of bits based on the digests in order to populate the bloom filter data structure.

19. The network traffic management system of claim 16, wherein the processors are further configured to be capable of executing the stored programmed instructions to:
increment a counter when the determination indicates that the probabilistic data structure indicates that the extracted credentials are included in the dictionary;
determine when a threshold number of likely matches in the dictionary has been identified based on the incremented counter; and
initiate the mitigation action, when the determination indicates that the threshold number of likely matches in the dictionary has been identified.

20. The network traffic management system of claim 19, wherein the processors are further configured to be capable of executing the stored programmed instructions to:
record a time each time the counter is incremented;
determine when each recorded time is outside of a sliding time window; and
decrement the counter, when the determination indicates that each recorded time is outside of the sliding time window.

* * * * *